US012610193B2

(12) United States Patent
Zhang

(10) Patent No.: US 12,610,193 B2
(45) Date of Patent: Apr. 21, 2026

(54) SPEAKER

(71) Applicant: AAC Microtech (Changzhou) Co., Ltd., Changzhou (CN)

(72) Inventor: Chao Zhang, Changzhou (CN)

(73) Assignee: AAG Microtech (Changzhou) Co., Ltd., Changzhou (CN)

( * ) Notice: Subject to any disclaimer, the term of this patent is extended or adjusted under 35 U.S.C. 154(b) by 131 days.

(21) Appl. No.: 18/605,777

(22) Filed: Mar. 14, 2024

(65) Prior Publication Data

US 2025/0203292 A1 Jun. 19, 2025

Related U.S. Application Data

(63) Continuation of application No. PCT/CN2023/139740, filed on Dec. 19, 2023.

(51) Int. Cl.

| | |
|---|---|
| ***H04R 9/06*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |

(52) U.S. Cl.

CPC ............... *H04R 9/025* (2013.01); *H04R 7/04* (2013.01); *H04R 7/18* (2013.01); *H04R 9/045* (2013.01); *H04R 9/06* (2013.01); *H04R 2209/024* (2013.01); *H04R 2400/11* (2013.01); *H04R 2499/11* (2013.01)

(58) Field of Classification Search

CPC . H04R 7/04; H04R 7/18; H04R 9/025; H04R 9/045; H04R 9/046; H04R 9/06; H04R 2209/024; H04R 2400/11; H04R 2499/11

See application file for complete search history.

(56) References Cited

U.S. PATENT DOCUMENTS

| | | | | |
|---|---|---|---|---|
| 2012/0237076 A1* | 9/2012 | Kuze | ........................ | H04R 7/20 381/387 |
| 2019/0238990 A1* | 8/2019 | Zhong | .................... | H04R 9/025 |
| 2019/0246212 A1* | 8/2019 | Zhang | ...................... | H04R 7/18 |
| 2020/0413199 A1* | 12/2020 | Song | ........................ | H04R 9/06 |
| 2022/0078557 A1* | 3/2022 | Kuroiwa | .................. | H04R 7/12 |
| 2024/0223958 A1* | 7/2024 | Zhao | ...................... | H04R 9/045 |

* cited by examiner

*Primary Examiner* — Huyen D Le

(74) *Attorney, Agent, or Firm* — Wiersch Law Group

(57) ABSTRACT

The present application provides a speaker including a basket frame, a magnetic circuit system and a vibration system. The magnetic circuit system includes a magnetic bowl, a main magnetic steel, and a sub-magnetic steel spaced apart from the main magnetic steel, with a magnetic gap formed in the space between the main magnetic steel and the sub-magnetic steel. The vibration system includes a diaphragm, and configured to drive the diaphragm to vibrate. The voice coil includes a first main body and a first projecting portion. The sub-magnetic steel includes a second main body and a second projecting portion. The first projecting portion and the second projecting portion are arranged staggeredly in the magnetic gap. The sub-magnetic steel is provided with localized projecting portions within the magnetic gap to reduce the localized magnetic gap to increase the driving force of the speaker and provide a greater output sensitivity.

8 Claims, 3 Drawing Sheets

SPEAKER

CROSS-REFERENCE TO RELATED APPLICATIONS

This application is a continuation of International Application No. PCT/CN2023/139740, filed on Dec. 19, 2023, the entire contents of which are incorporated herein by reference.

TECHNICAL FIELD

The present application relates to the field of speakers, in particular to a magnetic circuit system for speakers.

BACKGROUND

In recent years, with the rapid development of mobile communication technology, consumers are increasingly using mobile communication devices with voice functionality, such as portable telephones, handheld gaming devices, laptops, tablets, multimedia players, and other devices capable of communication through public or dedicated communication networks. As speakers serve as the playback devices for voice functionality, their internal magnetic circuit system directly influences the enhancement of the product's acoustic performance.

In existing speaker module designs, the magnetic gap on both sides is constant and the upper clamp plate and magnet are parallel to the voice coil. However, the problem of excessive wall thickness of the voice coil affects the magnetic gap, requiring simultaneous enlargement of the magnetic gaps along the entire edge. Therefore, most of the voice coils in existing speaker structures have large magnetic gaps, resulting in insufficient driving force.

Therefore, it is necessary to provide a new speaker to solve the above problem.

SUMMARY

An object of the present application is to provide a speaker with large driving force and high output sensitivity.

The technical solution of the present application is as follows: the present application provides a speaker comprising:

- a basket frame;
- a magnetic circuit system fixed to the basket frame, comprising:
  - a magnetic bowl;
  - a main magnetic steel affixed to a top of the magnetic bowl; and
  - a sub-magnetic steel spaced apart from the main magnetic steel, wherein a magnetic gap is formed in a space between the main magnetic steel and the sub-magnetic steel; and
- a vibration system, comprising:
  - a diaphragm fixedly arranged in the basket frame; and
  - a voice coil suspended in the magnetic gap and configured to drive the diaphragm to vibrate;
- wherein the voice coil comprises a first main body portion and a first projecting portion extending from a part of the first main body portion toward the magnetic gap; the sub-magnetic steel comprises a second main body portion and a second projecting portion extending from a part of the second main body portion toward the magnetic gap; and the first projecting portion and the second projecting portion are arranged staggeredly in the magnetic gap.

In some embodiments, the first main body portion comprises an inner ring portion and an outer ring portion extending from a side of the inner ring portion away from the diaphragm toward the sub-magnetic steel, and the first projecting portion is located on the outer ring portion.

In some embodiments, the sub-magnetic steel comprises a top portion close to the diaphragm and a bottom portion opposite to the top portion, and the second projecting portion extends from the top portion toward the bottom portion.

In some embodiments, there are at least two second projecting portions, and the second projecting portions are spaced apart in the magnetic gap.

The present application further provides a technical solution as follows: a speaker comprising:

- a basket frame;
- a magnetic circuit system fixed to the basket frame, comprising:
  - a magnetic bowl;
  - a main magnetic steel affixed to a top of the magnetic bowl;
  - a sub-magnetic steel spaced apart from the main magnetic steel; and
  - an upper clamp plate arranged above the sub-magnetic steel, wherein a magnetic gap is formed in a space between the main magnetic steel and the sub-magnetic steel; and
- a vibration system, comprising:
  - a diaphragm fixedly arranged in the basket frame; and
  - a voice coil suspended in the magnetic gap and configured to drive the diaphragm to vibrate;
- wherein the voice coil comprises a first main body portion and a first projecting portion extending from a part of the first main body portion toward the magnetic gap; the upper clamp plate comprises a third main body portion and a third projecting portion extending from a part of the third main body portion toward the magnetic gap; and the first projecting portion and the third projecting portion are arranged staggeredly in the magnetic gap.

In some embodiments, the first main body portion comprises an inner ring portion and an outer ring portion extending from a side of the inner ring portion away from the diaphragm toward the sub-magnetic steel, and the first projecting portion is located on the outer ring portion.

In some embodiments, the sub-magnetic steel comprises a second main body portion and a second projecting portion extending from a part of the second main body portion toward the magnetic gap; the second projecting portion is arranged in the magnetic gap, and the second projecting portion and the first projecting portion are arranged staggeredly.

In some embodiments, the sub-magnetic steel comprises a top portion close to the diaphragm and a bottom portion opposite to the top portion, and the second projecting portion extends from the top portion toward the bottom portion.

In some embodiments, the second projecting portion and the third projecting portion are parallel and aligned.

In some embodiments, there are at least two third projecting portions, and the third projecting portions are spaced apart in the magnetic gap.

The present application has the benefit that, compared to the related art, the present application provides a speaker in which the localized magnetic gap of the magnetic circuit system is reduced, thereby increasing the driving force of the speaker and providing a greater output sensitivity.

BRIEF DESCRIPTION OF THE DRAWINGS

In order to more clearly illustrate the technical solutions in the embodiments of the present application, the accompanying drawings that need to be used in the description of the embodiments will be briefly introduced as follows. Obviously, the accompanying drawings in the following description are only some of the embodiments of the present application. For the person of ordinary skill in the field, other accompanying drawings can be obtained based on these drawings without putting forth any creative labor.

DETAILED DESCRIPTION OF THE EMBODIMENTS

The technical solutions in the embodiments of the present application will be described clearly and completely in the following in conjunction with the accompanying drawings in the embodiments of the present application. Obviously, the described embodiments are only a part of the embodiments of the present application rather than all of the embodiments. Based on the embodiments in the present application, all other embodiments obtained by a person of ordinary skill in the art without making creative labor fall within the protection scope of the present application.

Figure 1:
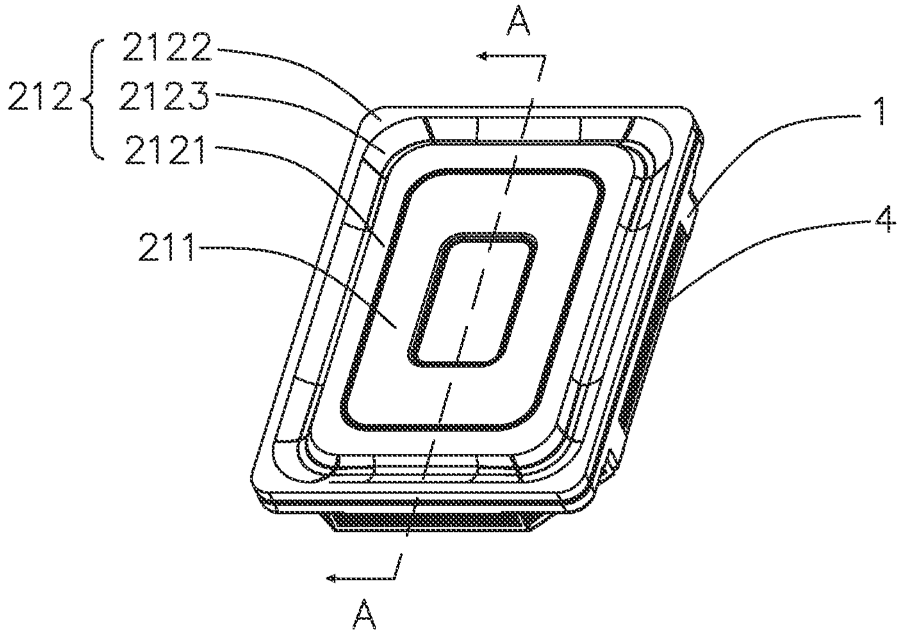
FIG. 1 shows a three-dimensional structural schematic diagram of a speaker provided by an embodiment of the present application.
Figure 2:
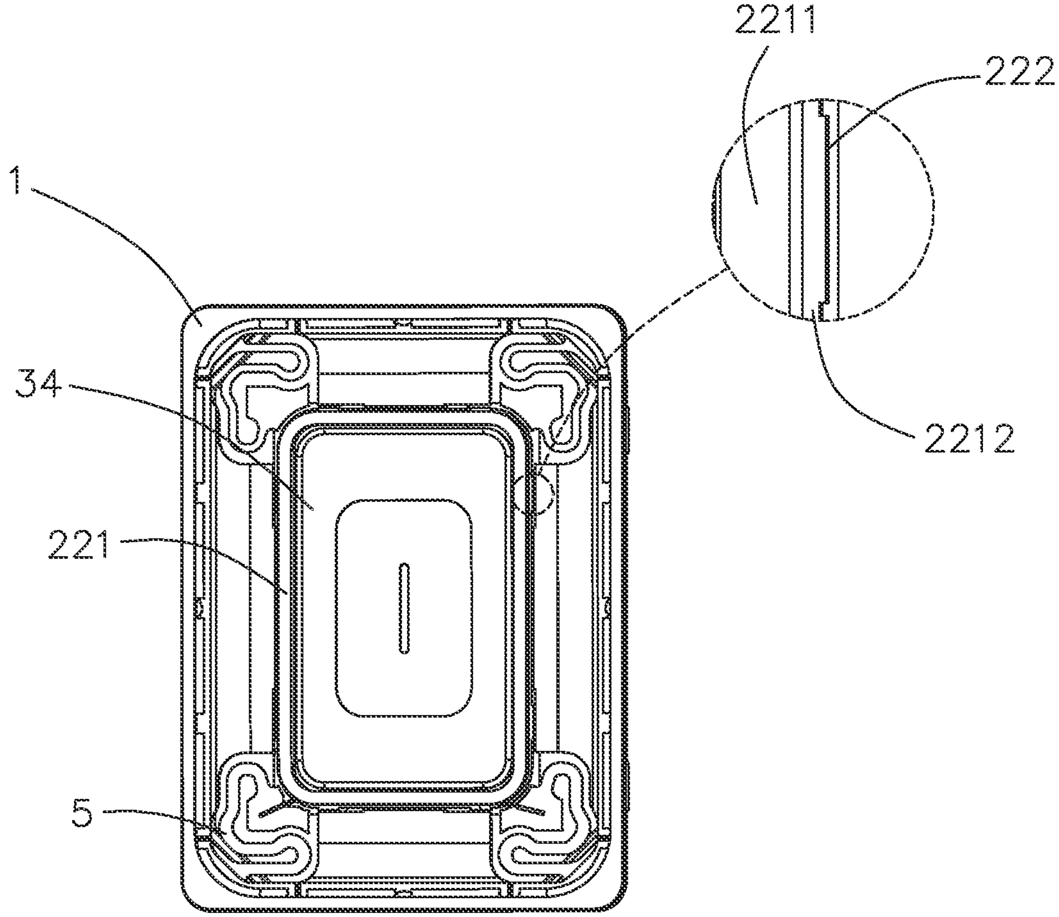
FIG. 2 shows a three-dimensional structural schematic diagram of the speaker shown in FIG. 1 with a diaphragm removed.
Figure 3:
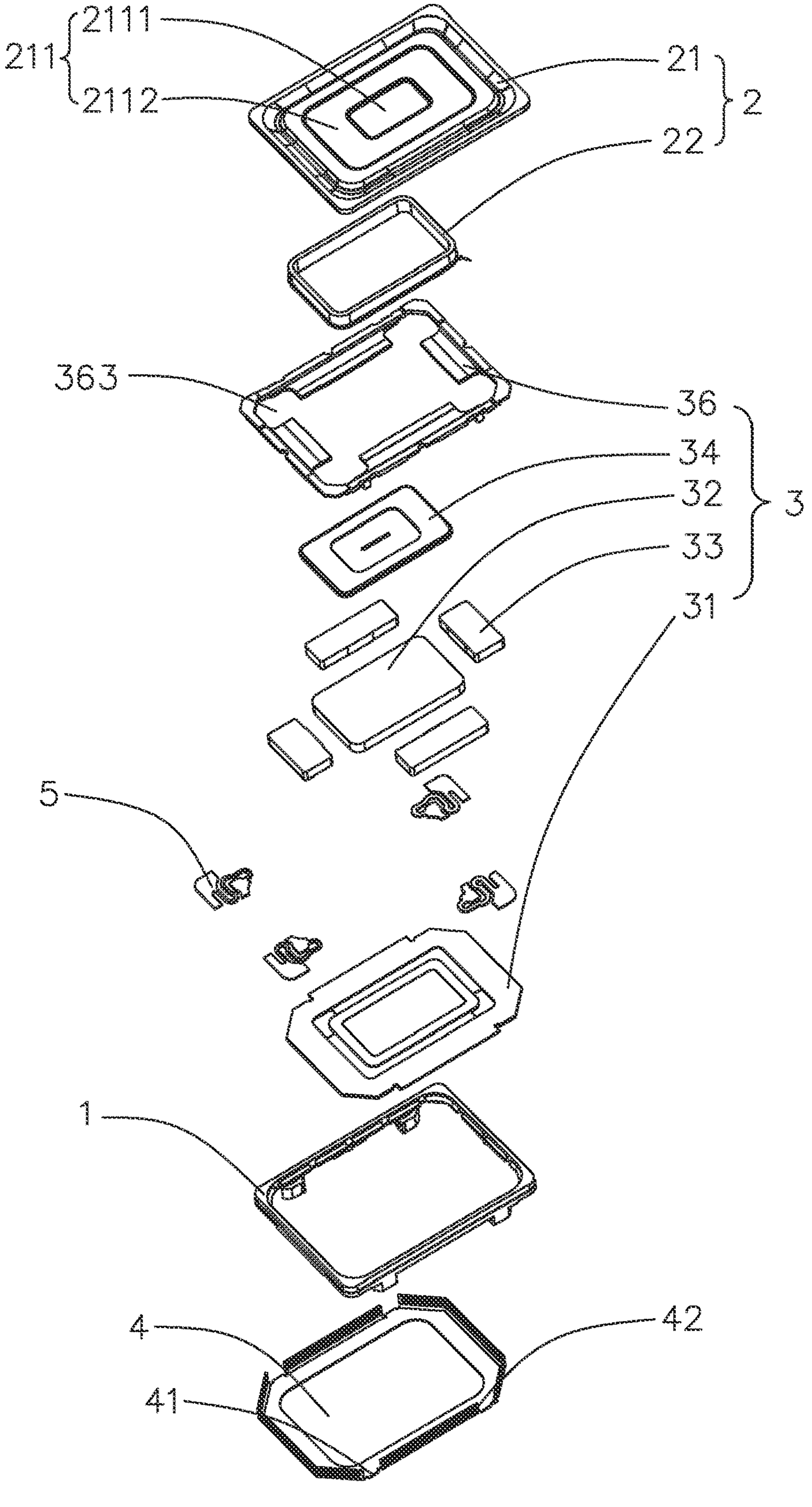
FIG. 3 shows an exploded view of the speaker shown in FIG. 1.
Figure 4:
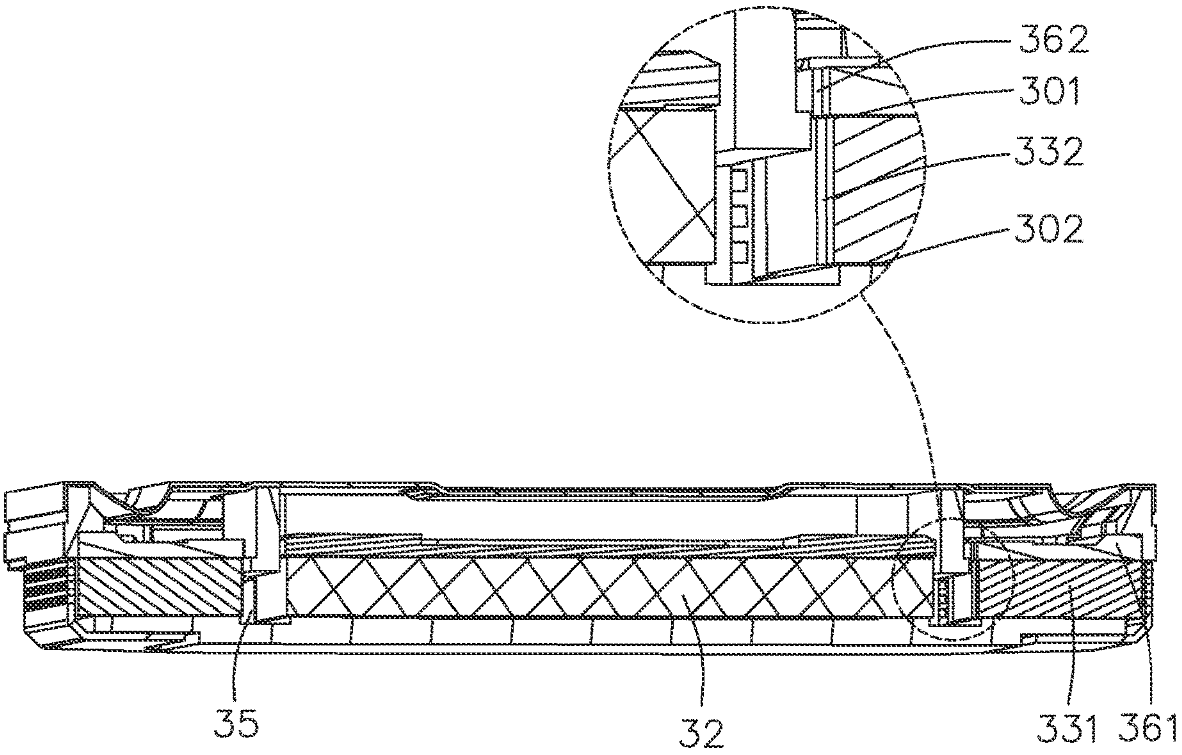
FIG. 4 shows a sectional view of the speaker shown in FIG. 1 along line A-A.

As shown in FIGS. 1-4, the present application provides a speaker 100 including a basket frame 1, a vibration system 2 fixed to the basket frame 1, a magnetic circuit system 3, and a separating member 4. The separating member 4 includes an avoidance portion 41 fixed to the basket frame 1 and a leakage hole 42 configured to adjust the air pressure inside the speaker 100.

The vibration system 2 includes a diaphragm 21 fixed to the basket frame 1 and a voice coil 22 configured to drive the diaphragm 21 to vibrate. The diaphragm 21 includes a dome 211 and a folded ring 212 arranged around the dome 211. The folded ring 212 includes a first fixing portion 2121 fixedly connected to the dome 211, a second fixing portion 2122 fixedly connected to the basket frame 1 and away from the dome 211, and a folded ring portion 2123 connecting the first fixing portion 2121 and the second fixing portion 2122 and having a curved shape. The dome 211 includes a recessed portion 2111 and a planar portion 2112 arranged around the recessed portion 2111. The voice coil 22 includes a first main body portion 221, and a first protruding portion 222 extending from the first main body portion 221. The first main body portion 221 includes an inner ring portion 2211 and an outer ring portion 2212 extending from a side of the inner ring portion 2211 away from the diaphragm 21, and the first projecting portion 222 is arranged on the outer ring portion 2212.

The magnetic circuit system 3 includes a magnetic bowl 31, a main magnetic steel 32 located above the magnetic bowl 31, a sub-magnetic steel 33 spaced apart from the main magnetic steel 32, and a main pole core 34 affixed to the top of the main magnetic steel 32. The main magnetic steel 32 and the sub-magnetic steel 33 form a magnetic gap 35. The sub-magnetic steel 33 includes a second main body portion 331 and a second projecting portion extending from a part of the second body portion 331 toward the magnetic gap 35. The first projecting portion 222 of the voice coil 22 and the second projecting portion 332 of the sub-magnetic steel 33 are arranged staggeredly in the magnetic gap 35. There are at least two projecting portions 332, and the projecting portions 332 are spaced apart in the magnetic gap 35.

The sub-magnetic steel 33 further includes a top portion 301 close to the diaphragm 21 and a bottom portion 302 opposite to the top portion 301. The second projecting portion 332 extends from the top portion 301 to the bottom portion 302.

The magnetic circuit system 3 further includes an upper clamp plate 36, and the upper clamp plate 36 is arranged above the sub-magnetic steel 33. The upper clamp plate 36 includes a third main body portion 361 and a third projecting portion 362 extending from a part of the third main body portion 361 toward the magnetic gap 35. The third projecting portion 362 and the first projecting portion 222 are arranged staggeredly in the magnetic gap 35. The third projecting portion 362 and the second projecting portion 332 are parallel and aligned. There are at least two third projecting portion 362 spaced apart in the magnetic gap 35, and the upper clamp plate further includes an avoidance hole 363.

The speaker 100 further includes an elastic connecting member 5 connecting the voice coil 22 to an external circuit, and the elastic connecting member 5 is located within the accommodating space of the avoidance hole 363.

In this embodiment, the second projecting portion 332 is provided at the sub-magnetic steel 33 and the third projecting portion 362 is provided at the upper clamp plate 36. In other embodiments, it is also possible to choose to provide the second projecting portion 332 at the sub-magnetic steel 33 alone or the third projecting portion 362 at the upper clamp plate 36 alone.

Compared to the related art, the present application provides a speaker including a basket frame, a magnetic circuit system fixed to the basket frame and a vibration system. The magnetic circuit system includes a magnetic bowl, a main magnetic steel affixed to the top of the magnetic bowl, and a sub-magnetic steel spaced apart from the main magnetic steel, with a magnetic gap formed in the space between the main magnetic steel and the sub-magnetic steel. The vibration system includes a diaphragm fixed to the basket frame, and a voice coil suspended in the magnetic gap and configured to drive the diaphragm to vibrate. The voice coil includes a first main body portion and a first projecting portion extending from a part of the first main body portion toward the magnetic gap. The sub-magnetic steel includes a second main body portion and a second projecting portion extending from a part of the second main body portion toward the magnetic gap. The first projecting portion and the second projecting portion are arranged staggeredly in the magnetic gap.

The present application further provides a speaker including a basket frame, a magnetic circuit system fixed to the basket frame and a vibration system. The magnetic circuit system includes a magnetic bowl, a main magnetic steel affixed to the top of the magnetic bowl, and a sub-magnetic steel spaced apart from the main magnetic steel, with a magnetic gap formed in the space between the main magnetic steel and the sub-magnetic steel. The vibration system includes a diaphragm fixed to the basket frame, and a voice coil suspended in the magnetic gap and configured to drive the diaphragm to vibrate. The voice coil includes a first main body portion and a first projecting portion extending from a part of the first main body portion toward the magnetic gap. The upper clamp plate includes a third main body portion and a third projecting portion extending from a part of the third main body portion toward the magnetic gap. The first projecting portion and the third projecting portion are arranged staggeredly in the magnetic gap.

The present application designs the sub-magnetic steel or/and the upper clamp plate to locally protrude within the magnetic gap so that the localized magnetic gap is reduced to increase the driving force of the speaker and provide a greater output sensitivity.

Described above are only some embodiments of the present application. It should be pointed out that, for people of ordinary skill in the field, improvements may be made without departing from the creative concept of the present application, but these fall within the protection scope of the present application.

What is claimed is:

1. A speaker comprising:

a basket frame;

a magnetic circuit system fixed to the basket frame, comprising:

a magnetic bowl;

a main magnetic steel affixed to a top of the magnetic bowl; and a sub-magnetic steel spaced apart from the main magnetic steel, wherein a magnetic gap is formed in a space between the main magnetic steel and the sub-magnetic steel; and a vibration system, comprising:

a diaphragm fixedly arranged in the basket frame; and a voice coil suspended in the magnetic gap and configured to drive the diaphragm to vibrate;

wherein the voice coil comprises a first main body portion and a plurality of first projecting portions extending from a part of the first main body portion toward the magnetic gap, the plurality of first projecting portions are arranged at intervals in a circumferential direction of the voice coil; the sub-magnetic steel comprises a second main body portion and a plurality of second projecting portions extending from a part of the second main body portion toward the magnetic gap; and the plurality of first projecting portions and the plurality of second projecting portions are arranged staggeredly along a circumferential direction of the voice coil in the magnetic gap.

2. The speaker of claim 1, wherein the first main body portion comprises an inner ring portion and an outer ring portion extending from a side of the inner ring portion away from the diaphragm toward the sub-magnetic steel, and the first projecting portions are located on the outer ring portion.

3. The speaker of claim 2, wherein the sub-magnetic steel comprises a top portion close to the diaphragm and a bottom portion opposite to the top portion; and the second projecting portions extend from the top portion toward the bottom portion.

4. A speaker comprising:

a basket frame;

a magnetic circuit system fixed to the basket frame, comprising:

a magnetic bowl;

a main magnetic steel affixed to a top of the magnetic bowl;

a sub-magnetic steel spaced apart from the main magnetic steel; and an upper clamp plate arranged above the sub-magnetic steel, wherein a magnetic gap is formed in a space between the main magnetic steel and the sub-magnetic steel; and a vibration system, comprising:

a diaphragm fixedly arranged in the basket frame; and a voice coil suspended in the magnetic gap and configured to drive the diaphragm to vibrate;

wherein the voice coil comprises a first main body portion and a plurality of first projecting portions extending from a part of the first main body portion toward the magnetic gap, the plurality of first projecting portions are arranged at intervals in a circumferential direction of the voice coil; the upper clamp plate comprises a third main body portion and a plurality of third projecting portions extending from a part of the third main body portion toward the magnetic gap; and the plurality of first projecting portions and the plurality of third projecting portions are arranged staggeredly along a circumferential direction of the voice coil in the magnetic gap.

5. The speaker of claim 4, wherein the first main body portion comprises an inner ring portion and an outer ring portion extending from a side of the inner ring portion away from the diaphragm toward the sub-magnetic steel; and the first projecting portions are located on the outer ring portion.

6. The speaker of claim 4, wherein the sub-magnetic steel comprises a second main body portion and a second projecting portion extending from a part of the second main body portion toward the magnetic gap; the second projecting portion is arranged in the magnetic gap, and the second projecting portion and the first projecting portions are arranged staggeredly.

7. The speaker of claim 6, wherein the sub-magnetic steel comprises a top portion close to the diaphragm and a bottom portion opposite to the top portion; and the second projecting portion extends from the top portion toward the bottom portion.

8. The speaker of claim 6, wherein the second projecting portion and the third projecting portions are parallel and aligned.

* * * * *